United States Patent
Ristaniemi et al.

(10) Patent No.: US 9,867,363 B2
(45) Date of Patent: Jan. 16, 2018

(54) DEVICE FOR PLUCKING DEAD HAIRS FROM THE SKIN OF A DOG

(71) Applicants: Markus Ristaniemi, Vantaa (FI); Sami Ristaniemi, Vantaa (FI)

(72) Inventors: Markus Ristaniemi, Vantaa (FI); Sami Ristaniemi, Vantaa (FI)

(*) Notice: Subject to any disclaimer, the term of this patent is extended or adjusted under 35 U.S.C. 154(b) by 86 days.

(21) Appl. No.: 14/554,870

(22) Filed: Nov. 26, 2014

(65) Prior Publication Data
US 2015/0156985 A1     Jun. 11, 2015

(30) Foreign Application Priority Data
Dec. 5, 2013 (FI) .................................... 2013 6226

(51) Int. Cl.
*A01K 13/00*     (2006.01)

(52) U.S. Cl.
CPC ............ *A01K 13/002* (2013.01); *A01K 13/00* (2013.01); *A46B 2200/1093* (2013.01)

(58) Field of Classification Search
CPC . A01K 13/00; A01K 13/02; A46B 2200/1093
USPC ......................................... 119/611, 618, 619
See application file for complete search history.

(56) References Cited

U.S. PATENT DOCUMENTS

| | | | | |
|---|---|---|---|---|
| 1,335,441 A | * | 3/1920 | Juricich | A01K 13/002 119/609 |
| 3,613,690 A | | 10/1971 | Newell | |
| 4,083,327 A | * | 4/1978 | Dowdy | A01K 13/002 119/601 |
| 5,207,183 A | | 5/1993 | Praschnik et al. | |
| 6,082,307 A | * | 7/2000 | Landreneau | A01K 13/002 119/616 |
| 6,782,846 B1 | | 8/2004 | Porter et al. | |
| 2008/0066690 A1 | | 3/2008 | Rosen | |

(Continued)

FOREIGN PATENT DOCUMENTS

| | | |
|---|---|---|
| EP | 0 476 185 A1 | 3/1992 |
| GB | 190207469 A | 0/1903 |

(Continued)

OTHER PUBLICATIONS

Extended European Search Report dated May 6, 2015 which was issued in a related European Patent Application No. 14191447.3 (6 pages).

(Continued)

*Primary Examiner* — Marc Burgess
(74) *Attorney, Agent, or Firm* — Ziegler IP Law Group, LLC

(57) ABSTRACT

A device for plucking dead hairs from the skin of a dog includes a handle part for handling the device, a stem part connected to the handle part, on the end of which stem part is a comb part for guiding the hairs of the dog into the device, a base on the stem part, onto which base hairs are guided by means of the comb part, a gripping part that is on the stem part and is moveable along a predetermined trajectory, which gripping part in a part of its trajectory moves in the direction of the base and presses against the base, in which case the hairs of the dog are between the base and the gripping part, and in which case by means of the movement of the gripping part a pulling motion is exerted on the hairs that are between the gripping part and the base.

9 Claims, 4 Drawing Sheets

(56) References Cited

U.S. PATENT DOCUMENTS

2009/0223008 A1  9/2009 Kissel, Jr.
2011/0067644 A1  3/2011 Prochaska
2011/0259281 A1  10/2011 Mak

FOREIGN PATENT DOCUMENTS

JP  11-276009 A  10/1999
JP  2001-120098 A  5/2001
JP  2010-187543 A  9/2010

OTHER PUBLICATIONS

Finnish Office Action and Finnish Search Report dated Jun. 24, 2014, which was issued by Finnish Patent Office in a related Finnish Patent Application No. 2013 6226(5 pages).

* cited by examiner

DEVICE FOR PLUCKING DEAD HAIRS FROM THE SKIN OF A DOG

CROSS-REFERENCE TO RELATED APPLICATION

The present application claims priority under 35 USC §119 of Finnish Patent Application No. 2013 6226, filed Dec. 5, 2013, the entire disclosure of which is incorporated herein by reference.

TECHNICAL FIELD

The object of the present invention is a device for plucking dead hairs from the skin of a dog.

The device is intended in particular for plucking the hairs of coarse-haired dogs, but it can also be applied to e.g. the removal of the loose hairs of smooth-haired dogs.

BACKGROUND INFORMATION

Coarse-haired dog breeds are trimmed to typify their breed by plucking. The purpose of trimming is to remove dead hair that has stopped growing, so that new hair can grow in its place. At the same time it enhances the wellbeing and health of the dog as well as shaping it to look like that breed.

If the dead hair is not removed in time, many layers of different-aged hairs grow in the coat, of which some detach when trimming and some do not. When all the dead hairs can be plucked from a dog in one session, the new covering of fur becomes tidy and even.

Plucking generally occurs with one's fingers or using a dull trimming knife. The purpose is to remove the hair whole, including the root, and not to cut it. Plucking always occurs in the direction that the hair grows.

Known in the art are some publications relating to the subject. For example, publication GB 190207469 A presents a device for removing coarse dog hair. The device includes brushes having the purpose of raising the coarse hair up from the undercoat and guiding it between two blades. The device is complex and there is reason to doubt its operability.

Publication JP 2010187543 A presents in particular a device intended for the epilation of coarse-haired dogs, wherein the gripping of the hair to be plucked and the detaching of the hair is arranged with two rotating wheels facing each other. The front part of the device has an aperture via which the hairs are pulled inside. The length of the hair to be detached is selected by adjusting the distance of the wheels from the aperture. Suction and a collection container are also attached to the device. The device is not presented as being for use in the removal of loose hairs. However, it has been observed that the plucking that occurs between the rolls operates poorly.

Publication U.S. Pat. No. 3,613,690 A presents a means/knife, with which coarse hairs can be plucked. This is thus utilized, as described earlier, in the manual method.

Publication JP 11276009 A presents a device with which the hairs being shed from the coat of a cat or dog can be removed, i.e. the device is aimed at the removal of the loose hairs of a smooth-haired animal. The device includes two brushes rotating in opposite directions for gripping the hairs and a suction means can be connected to the device for collecting the hairs.

Publication JP 2001120098 A presents a device for brushing and cleaning the coat of an animal. The device includes a belt onto which a brush-like surface is arranged, and which belt is arranged to travel while supported on rolls. Suction is connected to the device, for removing hairs and other debris.

Publication U.S. Pat. No. 5,207,183 A presents a device for removing fleas and other debris from the coat of a dog. In the device is a belt arranged to travel while supported on rolls, the surface of which belt has been made to be such that it collects fleas and other such debris from the coat. The device also includes a brush for brushing the coat. The device is not, however, intended for the removal of hair.

It can be deduced from the state of the art that up until now it has not been possible to develop a device with which dead hair could be removed from the coat of a coarse-haired dog, but instead plucking takes place, even today, manually. It is time-consuming and even causes skin problems on the hands. Brushes intended for collecting the loose hair of a smooth-haired dog are not suited for plucking the dead hair that is still attached in the coat of a coarse-haired dog.

It is also not possible to use corresponding technology, as e.g. in an epilator designed for people, in plucking the hairs of a coarse-haired dog. An epilator tears all the hair out and cannot differentiate between living and dead hair. An epilator-type device is also not suited for long hair (human hair is short). Dog hair requires a long straight-line pulling motion and effective removal of hair from the blades. A round roller of the epilator type clogs immediately.

SUMMARY

The present invention is directed to a device by means of which the dead hair of a coarse-haired dog can be removed (includes plucked) from the coat. The device according to one embodiment of the invention includes:
  a handle part for handling the device,
  a stem part connected to the handle part, on the end of which stem part is a comb part for guiding the hairs of the dog into the device,
  a base on the stem part, onto which base hairs are guided by means of the comb part,
  a gripping part that is on the stem part and is moveable along a predetermined trajectory, which gripping part in a part of its trajectory moves in the direction of the base and presses against the base, in which case the hairs of the dog are between the base and the gripping part,
  and in which case by means of the movement of the gripping part a pulling motion is exerted on the hairs that are between the gripping part and the base.

In one embodiment, at least one blade for gripping hairs is on the surface pointing towards the base of the gripping part.

In another embodiment, there are a number of blades in consecutive rows.

In yet another embodiment, the blades are sprung flexibly in the orthogonal direction with respect to the surface of the base.

An advantage of the invention is that it is possible to switch from manual plucking of hairs to plucking that occurs mechanically, which considerably speeds up the procedure. This also avoids stresses directed at the skin of the hand.

In the following, the invention will be described in more detail by the aid of some preferred embodiments with reference to the attached drawings, wherein FIG. 1 illustrates a device according to the invention for plucking dog hairs.

DETAILED DESCRIPTION

Figure 1:
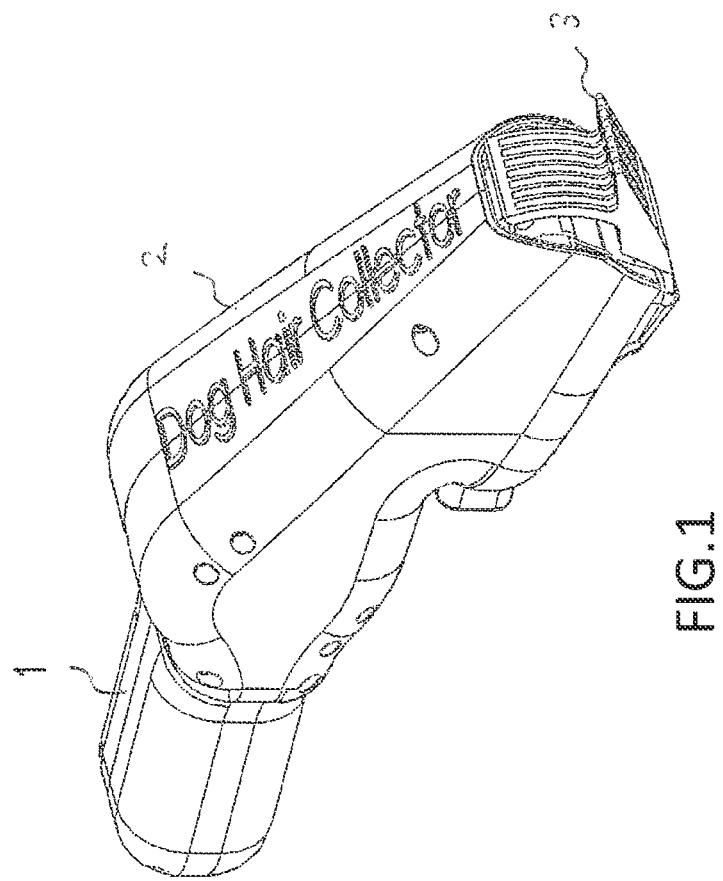

FIG. 1 presents a device according to the invention for plucking dog hairs, which device includes a handle part 1 and a stem part 2 connected to it. On the end of the stem part is a comb part 3, which when using the device is guided against the coat of the dog. In this case the comb part guides hairs (dead and alive) to inside the stem part, where the actual plucking occurs in the manner described hereinafter. The comb part 3 is installed in a detachable manner, in which case it can be replaced. The comb parts are of different sizes for dog coats of different lengths.

Figure 2:
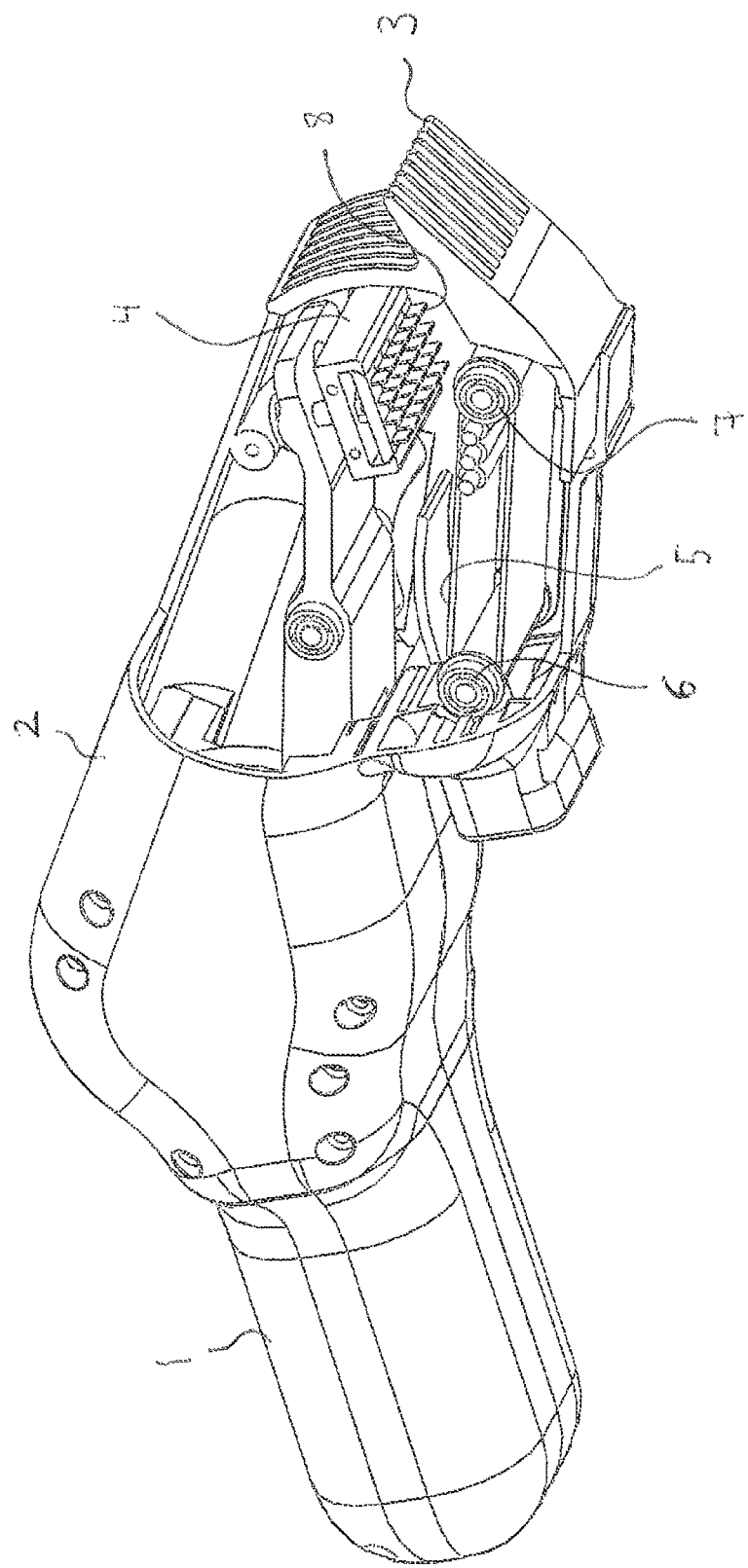
FIG. 2 illustrates a partially sectioned plucking device according to the invention.

FIG. 2 presents a partially sectioned plucking device according to the invention. The gripping part, that can be moved along a certain trajectory, is presented with the reference number 4 and the base with the reference number 5, against which base the gripping part is pressed on a part of its trajectory, as described hereinafter.

The base 5 is preferably an endless mat, which is installed around two freely rotating rolls 6, 7. The mat, which can be of e.g. rubber, is therefore in this embodiment freely rotatable. It is advantageous to arrange on the mat a brush surface for enhancing the collection of hairs. The collection container is not presented in the drawings, said container being installed on the left edge of the mat, when viewing FIG. 2, to the left of the roll 6 in such a way that the hairs fall from the mat into the collection container. The detachment of hairs from the mat can be further enhanced with a detachment means, which also is not presented in the drawings.

It is seen from FIG. 2 that blades 8 are arranged on the bottom surface of the gripping part, said surface pointing towards the base 5. The blades are sheet parts, which are fixed flexibly in the orthogonal direction with respect to the bottom surface of the gripping part. There can be one or more blades 8. In the embodiment of FIG. 2 there are a number of blades 8 side by side and in consecutive rows that are a small distance from each other. This is, however, only one possible alternative and the blades can also be in an indefinite sequence, and the size and shape of them can vary. What is essential in the blades is that they may not cut the hair, but instead the dead hair must be pulled intact out of the skin of the dog and the living hair must not be damaged.

Figure 3:
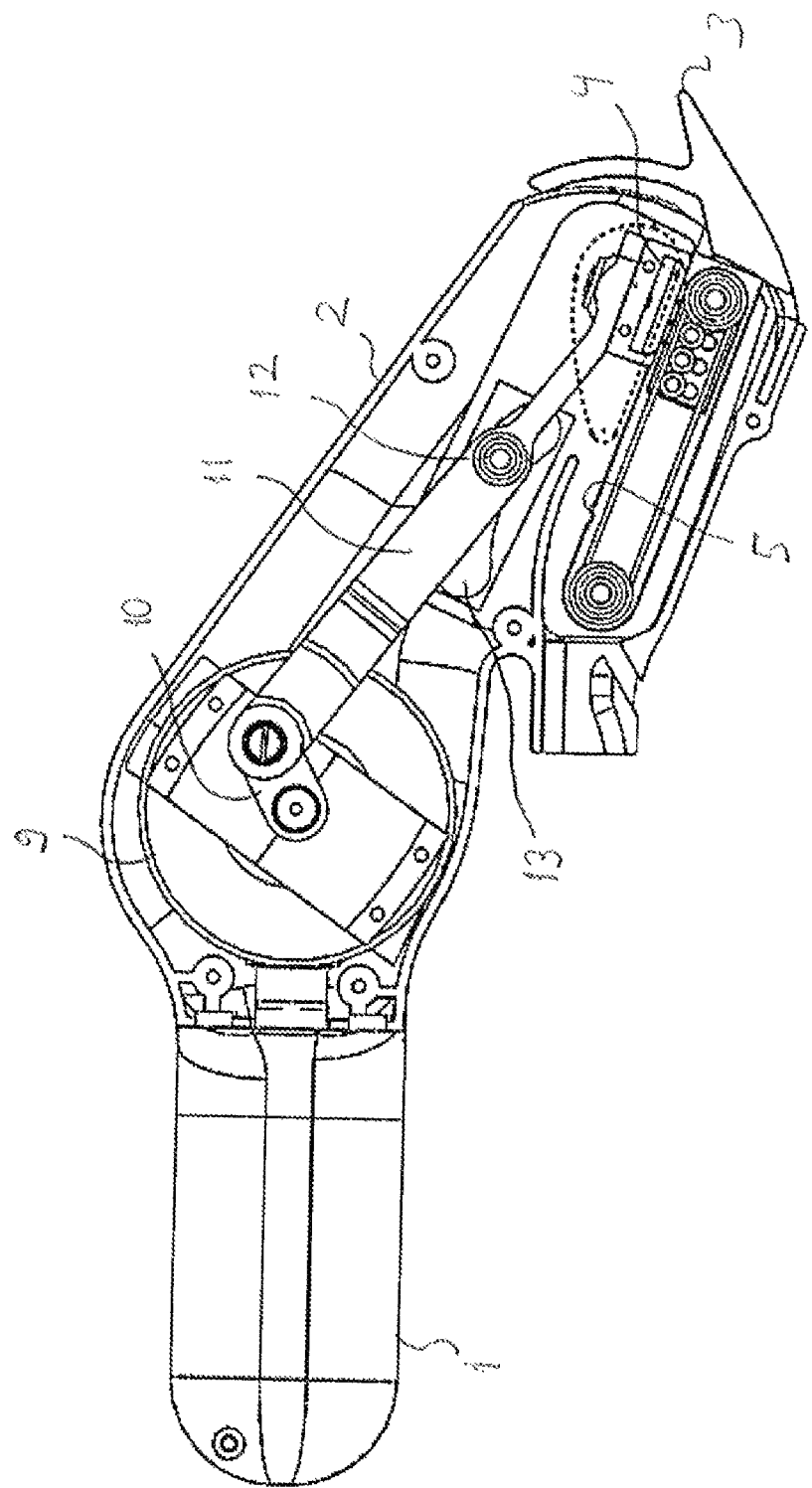
FIG. 3 illustrates a side view of a partially sectioned plucking device according to the invention.

The mechanism moving the gripping part is seen in FIG. 3. The device has e.g. a rechargeable, battery-driven electric motor, or an electric motor directly in connection with a network current, said motor rotating a disc 9, to the shaft of which a short lever 10 is fixed. To this, in turn, a freely turnable arm 11 is hinged, to the end of which arm the gripping part 4 is fixed. The arm 11 has protrusions or pins 12 that move in a curved recess 13 formed in the frame of the device. When the disc 9 rotates it brings about, by means of the mechanism described in the preceding, a trajectory in the gripping part 4, said trajectory being marked with a dashed line (FIG. 3). From this trajectory it is seen that the gripping part 4 travels for part of its trajectory linearly and in the direction of the base 5.

Figure 4A:
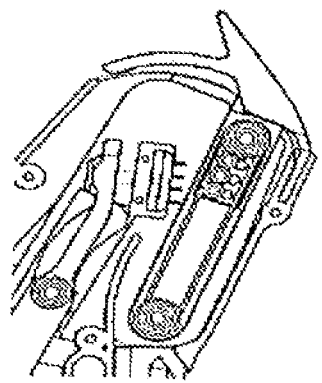
FIG. 4A illustrates a diagram where the gripping part is pressed against the base.

A more precise trajectory of the gripping part 4 is described in the series of diagrams of FIGS. 4A-4H. In FIG. 4A, the gripping part is pressed against the base 5 (a freely rotatable mat). In this case dog hairs are between the gripping part 4 and the mat, which hairs are guided to the base by means of the comb part 3. The gripping part moves to the left and at the same time moves the mat. In this case a pulling motion is exerted on the hairs, as a result of which the dead hairs detach from the coat of the dog, but because the blades 8 on the gripping part are sprung, they yield easily at the point of those hairs that are still living and firmly attached in the coat. In this case living hairs are not forcibly torn out and the dog does not suffer from the procedure. It is advantageous that the gripping part 4 and the mat move together at least 20 mm, in which case the pulling motion is long enough to detach the dead hairs. In theory, a shorter pulling motion can work, but according to observation not as well.

Figure 4B:
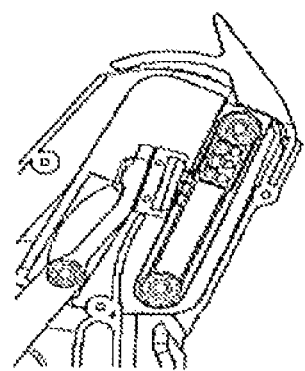
FIG. 4B illustrates a diagram where the gripping part has pressed against the base while moved to the left into its extreme position.
Figure 4C:
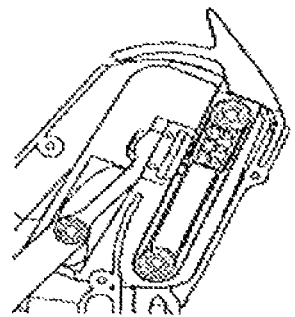
FIG. 4C illustrates a diagram where the gripping part starts to detach from the mat.
Figure 4D:
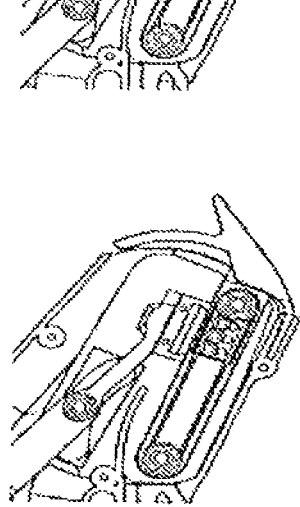
FIG. 4D illustrates a diagram where the gripping part is at a first position circulating toward the comb part.
Figure 4E:
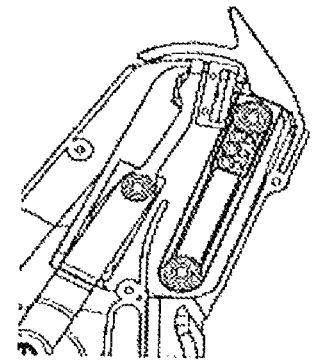
FIG. 4E illustrates a diagram where the gripping part is at a second position circulating toward the comb part.
Figure 4F:
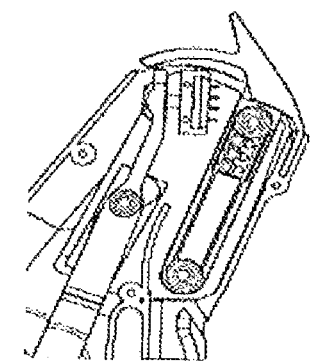
FIG. 4F illustrates a diagram where the gripping part is at a third position circulating toward the comb part.
Figure 4G:
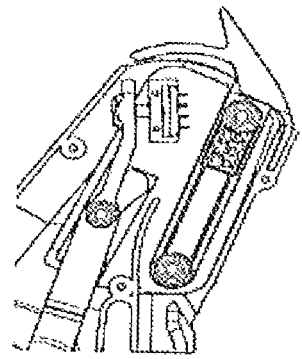
FIG. 4G illustrates a diagram where the gripping part is at a fourth position circulating toward the comb part.
Figure 4H:
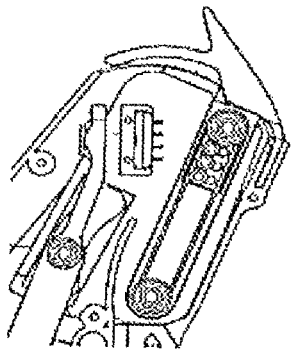
FIG. 4H illustrates a diagram where the gripping part is at a fifth position circulating toward the comb part having descended to the mat.

In FIG. 4B the gripping part has moved to the left into its extreme position, but is still attached to the mat. In FIG. 4C the gripping part starts to detach from the mat. In FIGS. 4C-G the gripping part 4 circulates around the top towards the comb part 3 and in FIG. 4H it descends again to the mat. In this phase the hairs of the dog that are guided via the comb part remain between the gripping part and the mat and the pulling motion can start here.

What is important is that the plucking occurs in a "pulsating" manner. The blades must in between let go of the hairs so that the device can proceed in the fur of the dog without a stoppage.

In practice the device according to the invention makes the same kind of plucking motion as when done with the fingers. It has been observed that the hair detaches as it should with this type of straight-line pulling motion.

The above-described invention is not limited to the embodiments described above, and the invention can be varied within the scope of the claims presented below. For example, it is possible to replace the gripping part 4 with a brush part, which can be used for removing the loose hairs of smooth-haired dogs.

In addition, it must be noted that the outer shape and outward appearance of the device can differ significantly from what is presented in the drawings. In the description and claims the handle part and the stem part are referred to separately. In some embodiments these could be one and the same part. The device is preferably held and that it has a guide part (comb part) with which hair is guided into the part of the device performing the plucking function.

The base 5 can possibly be formed also in many other ways than what is presented in the drawings. If it differs from being planar at that point at which the gripping part presses against it, the trajectory of the gripping part 4 must, of course, deviate from a straight line in the same way.

It is also possible that instead of flexible installation of the blades 8, the base 5 flexes or it is brought about in some other way that the living hairs are not torn out of the skin.

Instead of each blade being separately sprung, it is also possible that the whole gripping part 4 flexes.

The drawings present one method of implementing the base 5 and the gripping part 4. There are also many other possibilities. For example, both parts could be of the same kind as the gripping part 4 described earlier. In this case also, of course, blades 8 are needed in only one of the parts that would face each other. In the other, correspondingly, is a rubber surface. Both parts could also be mats similar to the base 5 described above, of which one would again have blades and the other a rubber surface. What is essential in the invention is to obtain a pulling motion in the hairs by means of these parts that are face-to-face, as described earlier.

The characteristic features possibly presented in the description in conjunction with other characteristic features can if necessary be used separately to each other.

The invention claimed is:

1. A device for plucking dead hairs from the skin of a dog, the device comprising:
   a handle part for handling the device;
   a stem part coupled to the handle part, the stem part having an end on which there is disposed a comb part for guiding the hairs of the dog;
   a base, disposed on the stem part, onto which hairs of the dog are guided by the comb part, and
   a gripping part disposed on the stem part which is moveable along a predetermined trajectory, the gripping part in a part of its trajectory moves in a direction of the base and presses against the base, such that the hairs of the dog are retained between the base and the gripping part; wherein the gripping part is fixed to an end of an arm, the arm comprising a protrusion that is configured to move in a curved recess formed in a frame of the device; and
   at least one blade for gripping hairs between the at least one blade and the base, the at least one blade disposed on a surface of the gripping part pointing towards the base, the at least one blade being disposed in an orthogonal direction with respect to the surface of the base, such that at least one of the at least one blade and the gripping part flexes when the gripping part is pressed against the base, and
   wherein as a result of the movement of the gripping part a pulling motion is exerted on the hairs of the dog that are between the gripping part and the base.

2. The device according to claim 1, wherein the at least one blade further comprises a plurality of blades arranged side by side in consecutive rows on a surface of the gripping part, where each row includes two or more blades pointing towards the base.

3. The device according to claim 1 wherein, when the gripping part presses against the base, the gripping part and the base move substantially together for at least 20 mm.

4. The device according to claim 1, wherein the base comprises an endless mat disposed around two rollers, and which is arranged to be freely moveable around the two rollers, and wherein as the gripping part moves when pressed against the endless mat, the endless mat is caused to move and dog hairs that are on the surface of the endless mat drop into a collection container disposed proximate the endless mat.

5. The device according to claim 4, further comprising a brush surface disposed on the endless mat, which brush surface improves the collection of hair.

6. The device according to claim 4 wherein an engagement of the gripping part and the endless mat enables the gripping part to move the endless mat around the two rollers.

7. The device according to claim 1, wherein the comb part is detachably coupled to the stem part, such that comb parts of different sizes can be detachably coupled to the stem part for use in connection with dog hair of different length.

8. The device according to claim 1, wherein the curved recess and protrusion are configured such that the movement of the protrusion in the curved recess defines the trajectory of the gripping part.

9. The device according to claim 1, wherein the curved recess and protrusion are configured such that the movement of the protrusion in the curved recess causes the gripping part to move in a non-circular trajectory.

* * * * *